(12) United States Patent
Askew

(10) Patent No.: US 8,285,457 B1
(45) Date of Patent: Oct. 9, 2012

(54) AUTOMATICALLY ADJUSTING SIDE MIRROR ASSEMBLY FOR A VEHICLE

(75) Inventor: Gerald W Askew, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 13/097,254

(22) Filed: Apr. 29, 2011

(51) Int. Cl.
*B60R 1/074* (2006.01)

(52) U.S. Cl. .......................................... 701/49; 359/841
(58) Field of Classification Search .................... 701/49; 359/841

See application file for complete search history.

(56) References Cited

U.S. PATENT DOCUMENTS

| | | | |
|---|---|---|---|
| 4,575,203 A | 3/1986 | Brandt | |
| 4,718,755 A | 1/1988 | Olson | |
| 4,957,359 A | 9/1990 | Kruse | |
| 4,988,179 A | 1/1991 | Stensland | |
| 4,989,964 A * | 2/1991 | Meise | 359/851 |
| 5,069,538 A | 12/1991 | Shust | |
| 5,179,470 A | 1/1993 | Olson | |
| 5,668,675 A | 9/1997 | Fredricks | |
| 5,801,823 A * | 9/1998 | Brandin | 356/139.03 |
| 5,886,838 A * | 3/1999 | Kuramoto | 359/841 |
| 5,959,367 A * | 9/1999 | O'Farrell et al. | 307/10.1 |
| 6,010,222 A | 1/2000 | Olson | |
| 6,176,587 B1 | 1/2001 | Fredricks | |
| 6,397,137 B1 * | 5/2002 | Alpert et al. | 701/49 |
| 6,406,170 B1 | 6/2002 | Abalos | |
| 6,501,536 B1 | 12/2002 | Fredricks | |
| 6,859,144 B2 * | 2/2005 | Newman et al. | 340/576 |
| 7,043,056 B2 | 5/2006 | Edwards | |
| 7,128,430 B2 * | 10/2006 | Serrano Fernandez et al. | 359/841 |
| 7,594,732 B2 * | 9/2009 | Kia | 359/855 |

FOREIGN PATENT DOCUMENTS

| | | |
|---|---|---|
| JP | 2007045217 A2 | 2/2007 |
| KR | 2012002528 U * | 4/2012 |

* cited by examiner

*Primary Examiner* — Mark Consilvio
(74) *Attorney, Agent, or Firm* — Jeffrey P. Calfa; Mark C. Bach; Gerald W. Askew

(57) ABSTRACT

An automatically adjusting side mirror assembly for a vehicle having an eye gaze detection system has a mirror subassembly, a support bracket, an actuator mechanism and a biasing mechanism. The mirror subassembly has a first and second position. The second position aligns the mirror subassembly generally parallel to the vehicle in order to provide better aerodynamics. The support bracket connects to the vehicle. The mirror subassembly is connected to the support bracket. The actuator mechanism and the biasing mechanism each connects to the mirror subassembly. The actuator mechanism has a first and second position corresponding to the first and second position of the mirror subassembly. The actuator mechanism is in electrical communication with the eye gaze detection system to position the mirror subassembly to the first position in response to an output of the eye gaze detection system. The biasing mechanism biases the mirror subassembly to the first position.

21 Claims, 6 Drawing Sheets

AUTOMATICALLY ADJUSTING SIDE MIRROR ASSEMBLY FOR A VEHICLE

TECHNICAL FIELD

The present disclosure relates to an automatically adjusting side mirror assembly for a vehicle such that the automatically adjusting side mirror has a first position to allow a vehicle operator to view the area behind or beside the vehicle, and a second position to improve an aerodynamic profile of the vehicle, and more particularly to an automatically adjusting side mirror that is disposed in the first position when the operator turns to look at the side mirror, and is disposed in the second position when the operator is not looking at the side mirror.

BACKGROUND

Operating expenses associated with vehicles are largely driven by fuel usage of the vehicle. One factor that affects fuel usage by a vehicle is the aerodynamic profile of the vehicle. For example, a large aerodynamic profile causes a vehicle to use more fuel than a small aerodynamic profile. One set of components that can affect the aerodynamic profile of a vehicle are the side mirrors. The side mirrors are mounted on the sides of the vehicle, and allow an operator to view the area behind the vehicle, as well as the area to the side of the vehicle, such as in an adjacent lane of traffic. In large vehicles, such as tractor-trailers or other heavy duty trucks, side mirrors are often large, so that the operator may have a more expansive view of the areas behind and beside the vehicle. Large side mirrors increase the aerodynamic profile of the vehicle and reduce fuel economy of the vehicle. An operator only utilizes the side mirrors for a fraction of the time the vehicle is in use. Thus, the side mirrors increase the aerodynamic profile for the vehicle at all times, but are only used for a small portion of the time the vehicle is operated, such as when changing lanes. Therefore, a need exists for an automatically adjusting side mirror capable of having a first position to allow the operator to see the area behind and beside the vehicle, and a second position that reduces the aerodynamic profile of the vehicle.

SUMMARY

According to one embodiment, an automatically adjusting side mirror assembly for a vehicle comprises a mirror subassembly, a support bracket, an actuator mechanism and a biasing mechanism. The mirror subassembly has a first position and a second position. The second position aligns the mirror subassembly generally parallel to the vehicle. The support bracket connects to the vehicle. The mirror subassembly is connected to the support bracket. The actuator mechanism connects to the mirror subassembly. The actuator mechanism has a first position and a second position corresponding to the first position and the second position of the mirror subassembly. The actuator mechanism is disposed in electrical communication with an eye gaze detection system to position the mirror subassembly to the first position in response to an output of the eye gaze detection system. The actuator mechanism may comprise an electric motor, a stepper motor, an electromagnetic actuator, a solenoid, a pneumatic actuator, or other suitable actuating device. The biasing mechanism connects to the mirror subassembly. The biasing mechanism biases the mirror subassembly to the first position. The biasing mechanism may comprise a permanent magnet, a spring, a gas strut, or other suitable passive biasing device. The actuator mechanism and the biasing mechanism may be designed to move the mirror subassembly between the first and second position at a high rate of speed, minimizing the transition time between the first and second position. The mirror subassembly, support bracket, actuator mechanism, or biasing mechanism may each be heated to prevent accumulation and deleterious effects of snow and ice.

According to another embodiment, an automatically adjusting side mirror assembly for a vehicle comprises multiple vertical or horizontal slats, a support bracket, an actuator mechanism and a biasing mechanism. The multiple vertical or horizontal slats have a first position and a second position. The second position aligns the multiple vertical or horizontal slats generally parallel to the vehicle. The support bracket connects to the vehicle. The multiple vertical or horizontal slats are connected to the support bracket. The actuator mechanism connects to the multiple vertical or horizontal slats. The actuator mechanism has a first position and a second position corresponding to the first position and the second position of the multiple vertical or horizontal slats. The actuator mechanism is disposed in electrical communication with an eye gaze detection system to position the multiple vertical or horizontal slats to the first position in response to an output of the eye gaze detection system. The actuator mechanism may comprise an electric motor, a stepper motor, an electromagnetic actuator, a solenoid, a pneumatic actuator, or other suitable actuating device. The biasing mechanism connects to the multiple vertical or horizontal slats. The biasing mechanism biases the multiple vertical or horizontal slats to the first position. The biasing mechanism may comprise a permanent magnet, a spring, a gas strut, or other suitable passive biasing device. The actuator mechanism and the biasing mechanism may be designed to move the multiple vertical or horizontal slats between the first and second position at a high rate of speed, minimizing the transition time between the first and second position. The multiple vertical or horizontal slats, support portion, actuator mechanism, or biasing mechanism may each be heated to prevent accumulation and deleterious effects of snow and ice.

According to another embodiment, a vehicle having an automatically adjusting side mirror assembly comprises an eye gaze detection system, a controller, a mirror subassembly, a support bracket, an actuator mechanism, and a biasing mechanism. The controller is disposed in electrical communication with the eye gaze detection system and is configured to receive an output signal of the eye gaze detection system. The automatically adjusting side mirror assembly has a mirror subassembly and a support bracket. The mirror subassembly has a first position and a second position. The mirror subassembly is connected to the support bracket. The second position aligns the mirror subassembly generally parallel to the vehicle. The actuator mechanism is connected to the mirror subassembly. The actuator mechanism has a first position and a second position corresponding to the first position and the second position of the mirror subassembly. The actuator mechanism is disposed in electrical communication with controller to position the mirror subassembly to the first position in response to an output of the controller. The controller may have an override setting which causes the actuator mechanism to maintain the mirror subassembly in the first position at all times, irrespective of the output signal of the eye gaze detection system. The actuator mechanism may comprise an electric motor, a stepper motor, an electromagnetic actuator, a solenoid, a pneumatic actuator, or other suitable actuating device. A biasing mechanism connects to the mirror subassembly. The biasing mechanism biases the mirror subassembly to the first position. The biasing mechanism may comprise a permanent magnet, a spring, a gas strut, or other suitable passive biasing device. The actuator mechanism and the biasing mechanism may be designed to move the mirror subassembly between the first and second position at a high rate of speed, minimizing the transition time between the first and second position. The mirror subassembly, support bracket, actuator mechanism, or biasing mechanism may each be heated to prevent accumulation and deleterious effects of snow and ice.

According to another embodiment, a vehicle having an automatically adjusting side mirror assembly comprises an eye gaze detection system, a controller, a mirror subassembly comprised of multiple vertical or horizontal slats, a support bracket, an actuator mechanism, and a biasing mechanism. The controller is disposed in electrical communication with the eye gaze detection system and is configured to receive an output signal of the eye gaze detection system. The multiple vertical or horizontal slats of the mirror subassembly are connected to a support bracket. The multiple vertical or horizontal slats have a first position and a second position. The second position aligns the multiple vertical or horizontal slats generally parallel to the vehicle. The actuator mechanism is connected to the multiple vertical or horizontal slats. The actuator mechanism has a first position and a second position corresponding to the first position and the second position of the multiple vertical or horizontal slats. The actuator mechanism is disposed in electrical communication with the controller to position the multiple vertical or horizontal slats to the first position in response to an output of the controller. The controller may have an override setting which causes the actuator mechanism to maintain the multiple vertical or horizontal slats in the first position at all times, irrespective of the output signal of the eye gaze detection system. The actuator mechanism may comprise an electric motor, a stepper motor, an electromagnetic actuator, a solenoid, a pneumatic actuator, or other suitable actuating device. A biasing mechanism connects to the multiple vertical or horizontal slats. The biasing mechanism biases the multiple vertical or horizontal slats to the first position. The biasing mechanism may comprise a permanent magnet, a spring, a gas strut, or other suitable passive biasing device. The actuator mechanism and the biasing mechanism may be designed to move the multiple vertical or horizontal slats between the first and second position at a high rate of speed, minimizing the transition time between the first and second position. The multiple vertical or horizontal slats, support bracket, actuator mechanism, or biasing mechanism may each be heated to prevent accumulation and deleterious effects of snow and ice.

According to one process, a method of operating an automatically adjusting side mirror assembly for a vehicle having an eye gaze detection system is provided. The method determines whether a vehicle operator is attempting to use the automatically adjusting side mirror assembly utilizing the eye gaze detection system. The mirror subassembly of the automatically adjusting side mirror assembly is positioned to a first mirror portion position from a second mirror portion position when the eye gaze detection system determines the vehicle operator is attempting to use the automatically adjusting side mirror assembly. The second mirror subassembly position is generally parallel to the vehicle.

As described above, the Automatically Adjusting Side Mirror Assembly for a Vehicle and a vehicle made with this system provide a number of advantages, some of which have been described above and others of which are inherent in the invention. Also, modifications may be proposed to the Automatically Adjusting Side Mirror Assembly for a Vehicle or a vehicle made with this system without departing from the teachings herein.

DETAILED DESCRIPTION

Figure 1:
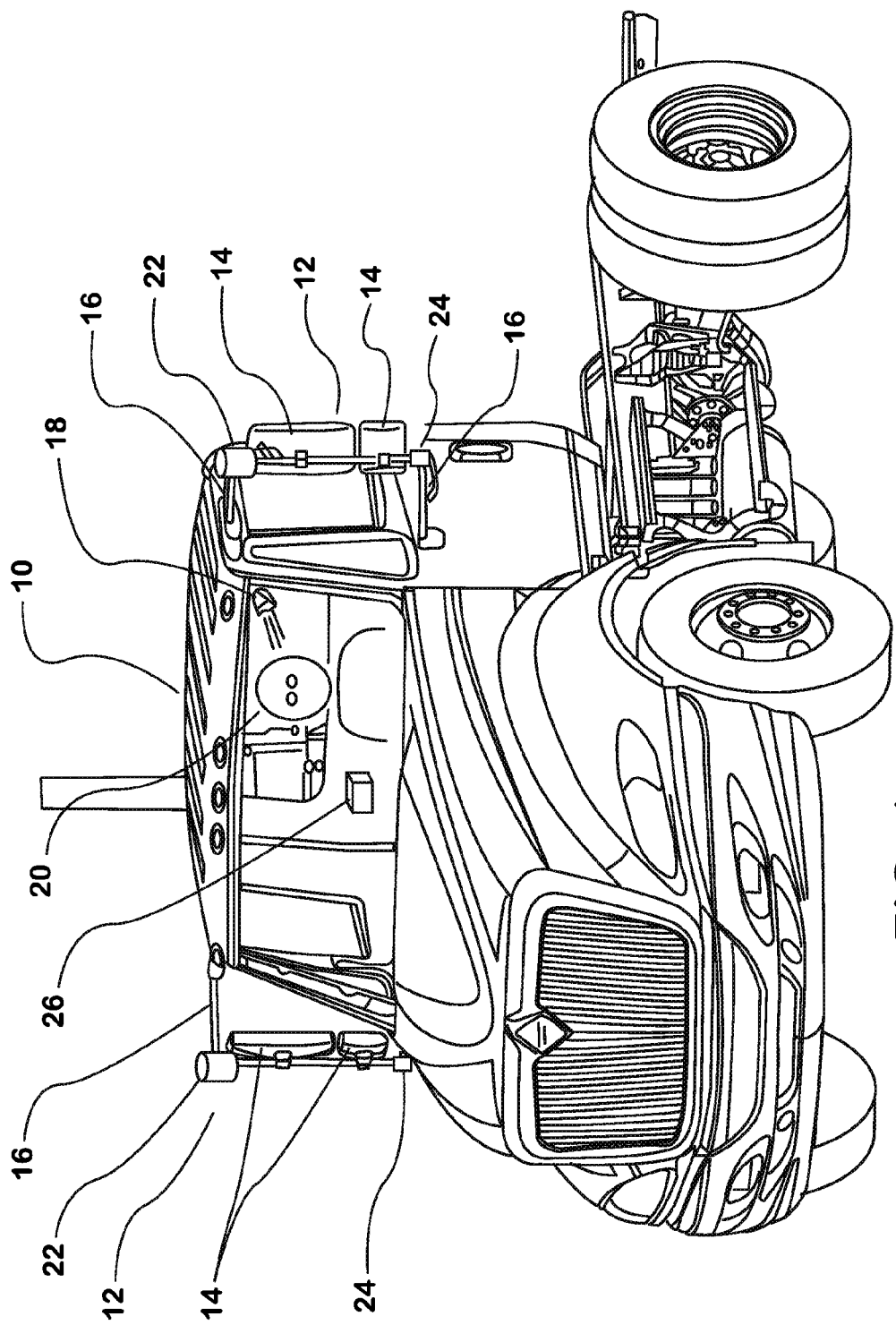
FIG. 1 is a schematic view of a vehicle having an automatically adjusting side mirror assembly with a mirror subassembly in a first position.
Figure 2:
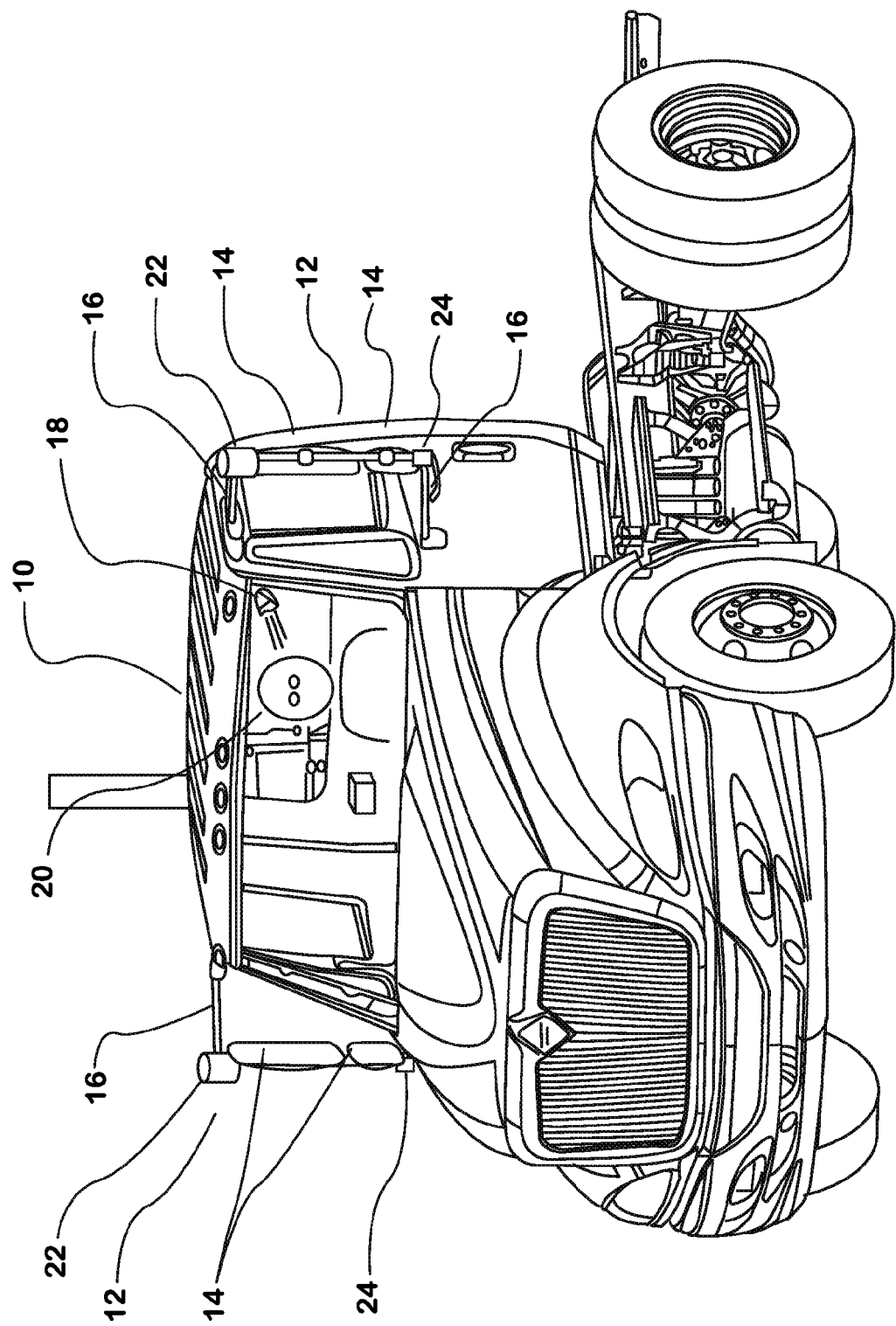
FIG. 2 is a schematic view of the vehicle having an automatically adjusting side mirror assembly of FIG. 1 with the side mirror subassembly in a second position.

FIG. 1 and FIG. 2 each show a schematic view of a vehicle 10 having automatically adjusting side mirror assemblies 12. The automatically adjusting side mirror assemblies 12 have mirror subassemblies 14 and support brackets 16. The support brackets 16 are attached to the vehicle 10 and dispose the mirror subassemblies 14 away from the vehicle 10, such that the mirror subassemblies 14 provide a view of the areas behind and to the sides of the vehicle 10. The vehicle 10 has an eye gaze detection system 18 to monitor the direction an operator 20 of the vehicle 10 is looking The eye gaze detection system 18 uses traditional eye gaze detection technology, such as that described in U.S. Pat. No. 7,043,056, incorporated by reference herein, to determine whether the operator 20 is looking to one of the automatically adjusting side mirror assemblies 12.

The automatically adjusting side mirror assemblies 12 have actuator mechanisms 22 that connect the mirror subassemblies 14 to the support brackets 16. The actuator mechanisms 22 move the mirror subassemblies 14 of the automatically adjusting side mirror assemblies 12 from a first position for using the mirror subassemblies 14 when the operator 20 is looking to one of the automatically adjusting side mirror assemblies 12 (FIG. 1) and a second position when the operator 20 is not looking to one of the automatically adjusting side mirror assemblies 12 (FIG. 2). When the mirror subassemblies 14 are in the second position, the mirror subassemblies 14 provide a smaller aerodynamic profile, thereby reducing aerodynamic drag on the vehicle 10. It is contemplated that the actuator mechanisms 22 may be electric motors, stepper motors, electromagnetic actuators, solenoids, pneumatic actuators, or other suitable actuating devices adapted to rapidly move the mirror subassemblies 14.

Biasing mechanisms 24 are additionally provided that connect the mirror subassemblies 14 to the lower portion of the support brackets 16. The biasing mechanisms 24 bias the mirror subassemblies 14 to the first position, such that a failure of one or both of the actuator mechanisms 22 will allow the operator 20 of the vehicle 10 to use the mirror subassemblies 14 of the automatically adjusting side mirror assemblies 12. Therefore, the actuator mechanisms 22 must supply a force to the mirror subassemblies 14 to overcome the force provided by the biasing mechanisms 24. It is contemplated that the biasing mechanisms 24 may be permanent magnets, springs, gas struts, or other suitable passive biasing device, to provide the biasing force.

In operation, the operator 20 looks towards one of the automatically adjusting side mirror assemblies 12, and the eye gaze detection system 18 detects that the operator 20 is looking at one of the automatically adjusting side mirror assemblies 12. The actuator mechanism 22 quickly moves the mirror subassembly 14 of the automatically adjusting side mirror assembly 12 from the first position to the second position. Once the eye gaze detection system 18 detects the operator 20 is no longer looking towards one of the automatically adjusting side mirror assemblies 12, the actuator mechanism 22 moves the mirror subassembly 14 back to the second position. The biasing mechanism 24 supplies a force to the mirror subassembly 14 that the actuator mechanism 22 must overcome in order to position the mirror subassembly 14 to the second position as shown in FIG. 2.

As shown in FIGS. 1 and 2 a controller 26 is provided within the vehicle 10 to operate the automatically adjusting side mirror assemblies 12. The controller 26 is in electrical communication with the actuator mechanisms 22 and the eye gaze detection system 18. The controller receives an input signal from the eye gaze detection system 18 and generates an output signal sent to the actuator mechanisms 22 when the eye gaze detection system 18 determines the operator 20 is looking towards the mirror subassemblies 14. The actuator mechanism 22 then moves the mirror subassemblies 14 of the automatically adjusting side mirror assemblies 12 from the second position (FIG. 2) to the first position (FIG. 1) so that the operator 20 may use the mirror subassemblies 14.

Figure 3:
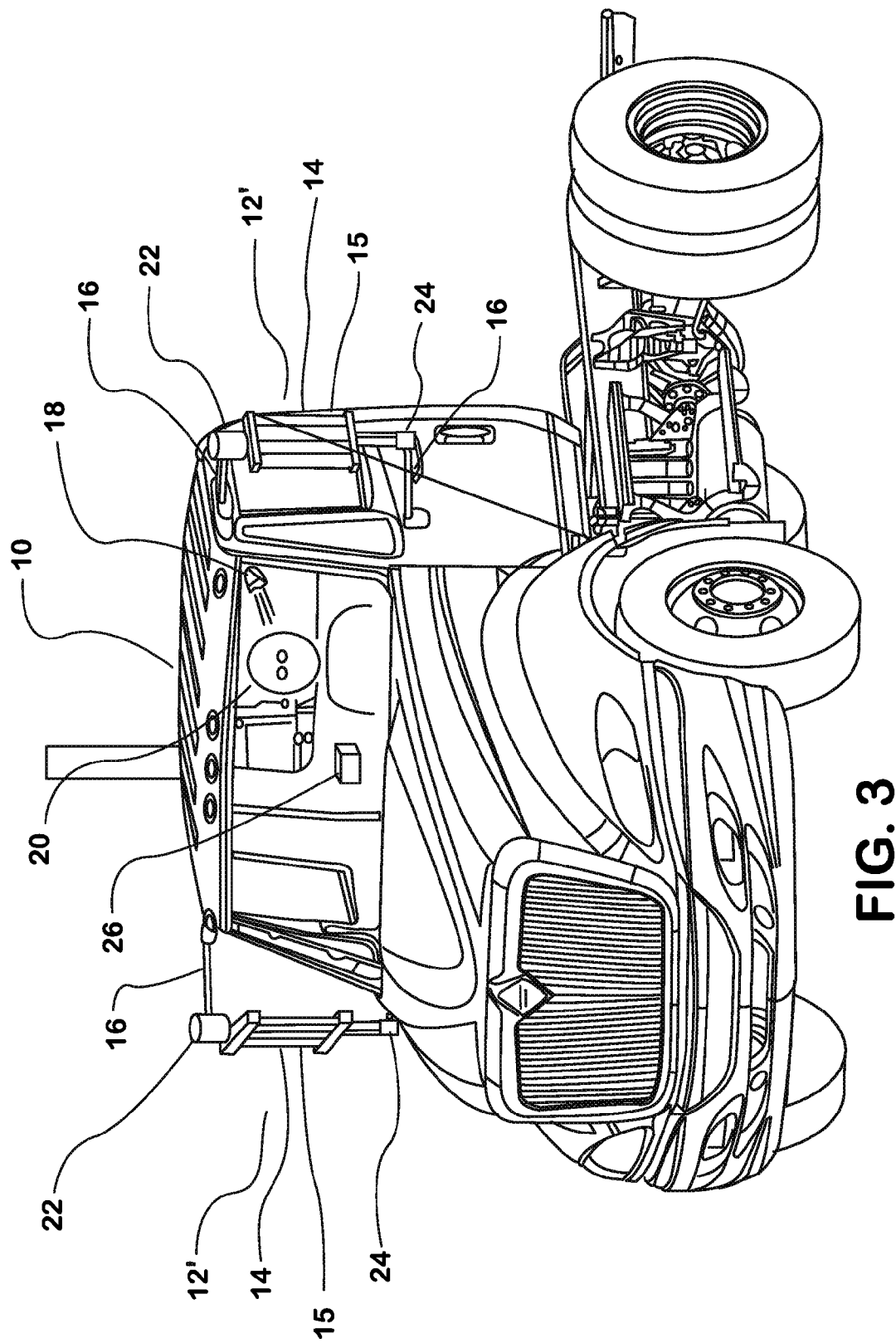
FIG. 3 is a schematic view of a vehicle having an automatically adjusting side mirror assembly with a mirror subassembly comprised of multiple vertical slats in a first position.
Figure 4:
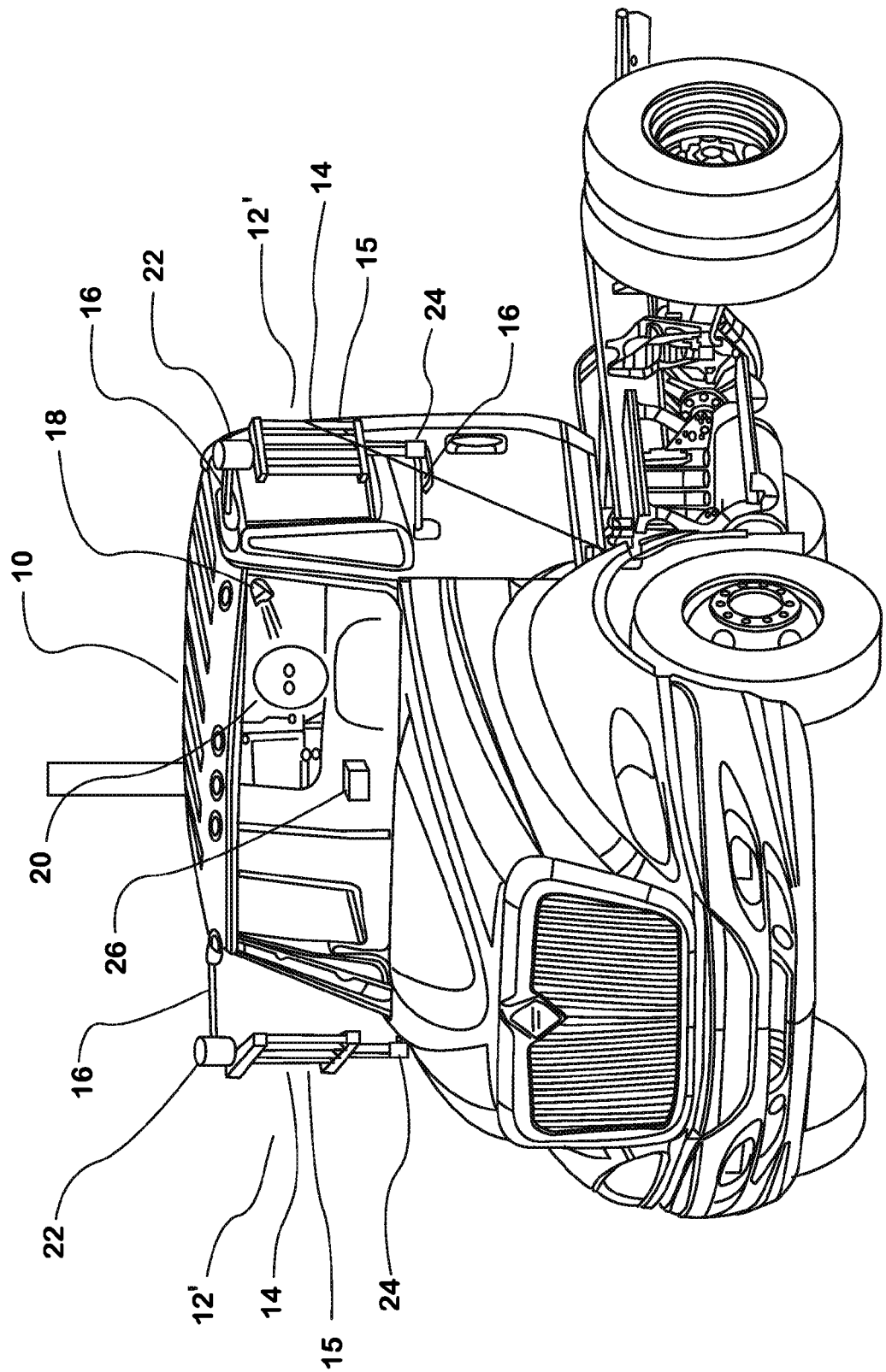
FIG. 4 is a schematic view of a vehicle having an automatically adjusting side mirror assembly with a mirror subassembly comprised of multiple vertical slats in a second position.

FIG. 3 and FIG. 4 each show a schematic view of a vehicle 10 having an alternative embodiment of automatically adjusting side mirror assemblies 12'. The automatically adjusting side mirror assemblies 12' in FIG. 3 and FIG. 4 have mirror subassemblies 14 comprised of vertical mirror slats 15, as well as support brackets 16. The support brackets 16 are attached to the vehicle 10 and dispose the mirror subassemblies 14 away from the vehicle 10, such that the mirror subassemblies 14 provide a view of the areas behind and to the sides of the vehicle 10. The vehicle 10 has an eye gaze detection system 18 to monitor the direction an operator 20 of the vehicle 10 is looking The eye gaze detection system 18 again uses traditional eye gaze detection technology, such as that described in U.S. Pat. No. 7,043,056 to determine whether the operator 20 is looking to one of the automatically adjusting side mirror assemblies 12'.

The automatically adjusting side mirror assemblies 12' have actuator mechanisms 22 that connect the vertical mirror slats 15 of the mirror subassemblies 14 to the support brackets 16. The actuator mechanisms 22 move the vertical mirror slats 15 of the mirror subassemblies 14 from a first position for using the mirror subassemblies 14 when the operator 20 is looking to one of the automatically adjusting side mirror assemblies 12' (FIG. 3) and a second position when the operator 20 is not looking to one of the automatically adjusting side mirror assemblies 12' (FIG. 4). When the mirror subassemblies 14 are in the second position, the mirror subassemblies 14 provide a smaller aerodynamic profile due to the alignment of the vertical mirror slats 15, thereby reducing aerodynamic drag on the vehicle 10. It is contemplated that the actuator mechanisms 22 may be electric motors, stepper motors, electromagnetic actuators, solenoids, pneumatic actuators, or other suitable actuating devices adapted to rapidly move the vertical mirror slats 15 of the mirror subassemblies 14.

Biasing mechanisms 24 are again provided that connect the mirror subassemblies 14 to the lower part of the support brackets 16. The biasing mechanisms 24 bias the vertical mirror slats 15 of the mirror subassemblies 14 to the first position, such that a failure of one or both of the actuator mechanisms 22 will allow the operator 20 of the vehicle 10 to use the mirror subassemblies 14 of the automatically adjusting side mirror assemblies 12'. Therefore, the actuator mechanisms 22 must supply a force to the vertical mirror slats 15 of the mirror subassemblies 14 to overcome the force provided by the biasing mechanisms 24. It is contemplated that the biasing mechanisms 24 may be permanent magnets, springs, gas struts, or other suitable passive biasing device, to provide the biasing force.

In operation, the operator 20 looks towards one of the automatically adjusting side mirror assemblies 12', and the eye gaze detection system 18 detects that the operator 20 is looking at one of the automatically adjusting side mirror assemblies 12'. The actuator mechanism 22 quickly moves the vertical mirror slats 15 of the mirror subassembly 14 of the automatically adjusting side mirror assembly 12' from the first position to the second position. Once the eye gaze detection system 18 detects the operator 20 is no longer looking towards one of the automatically adjusting side mirror assemblies 12', the actuator mechanism 22 moves the vertical mirror slats 15 of the mirror subassembly 14 back to the second position. The biasing mechanism 24 supplies a force to the mirror subassembly 14 that the actuator mechanism 22 must overcome in order to position the mirror subassembly 14 to the second position as shown in FIG. 4.

Figure 5:
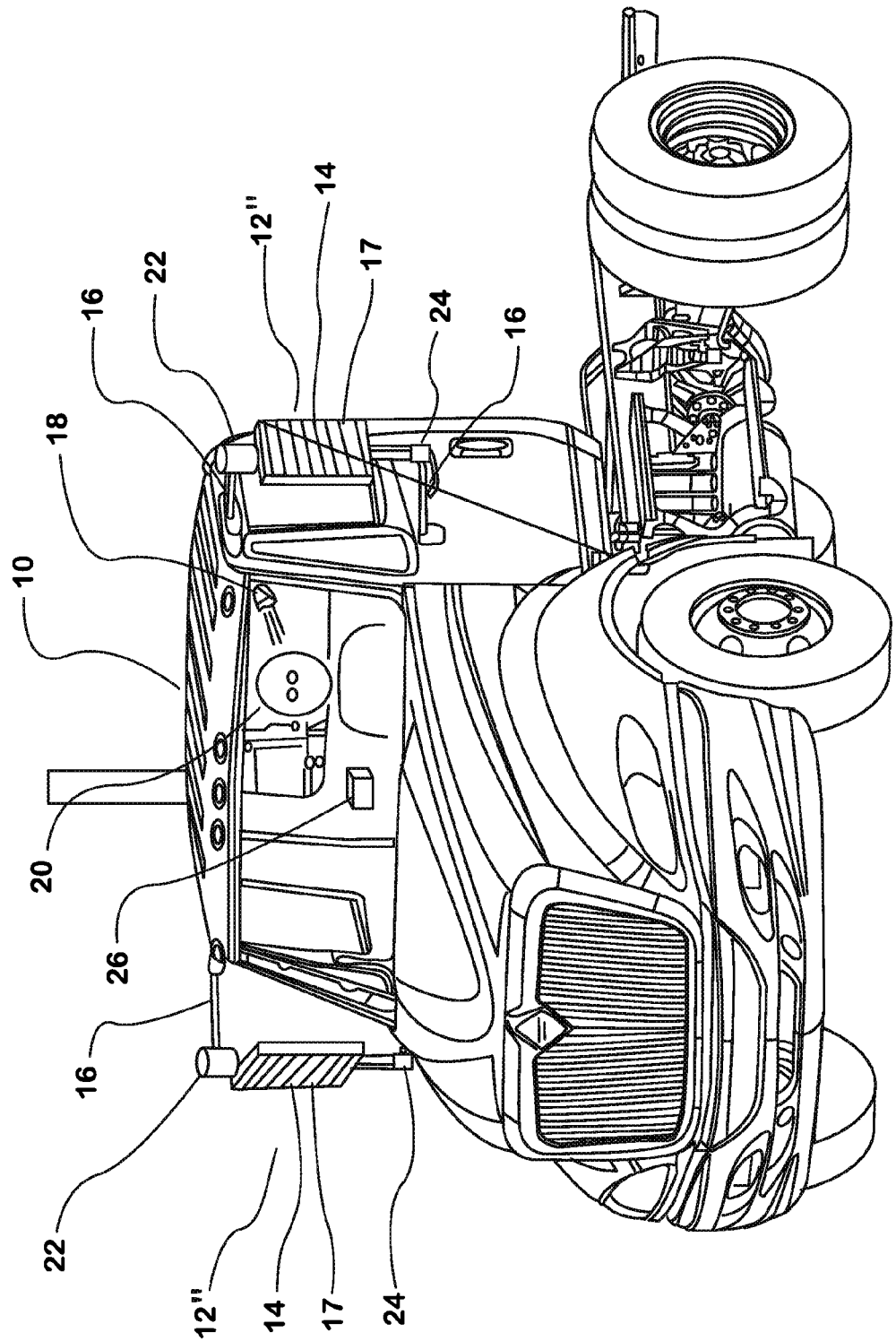
FIG. 5 is a schematic view of a vehicle having an automatically adjusting side mirror assembly with a mirror subassembly comprised of multiple horizontal slats in a first position.
Figure 6:
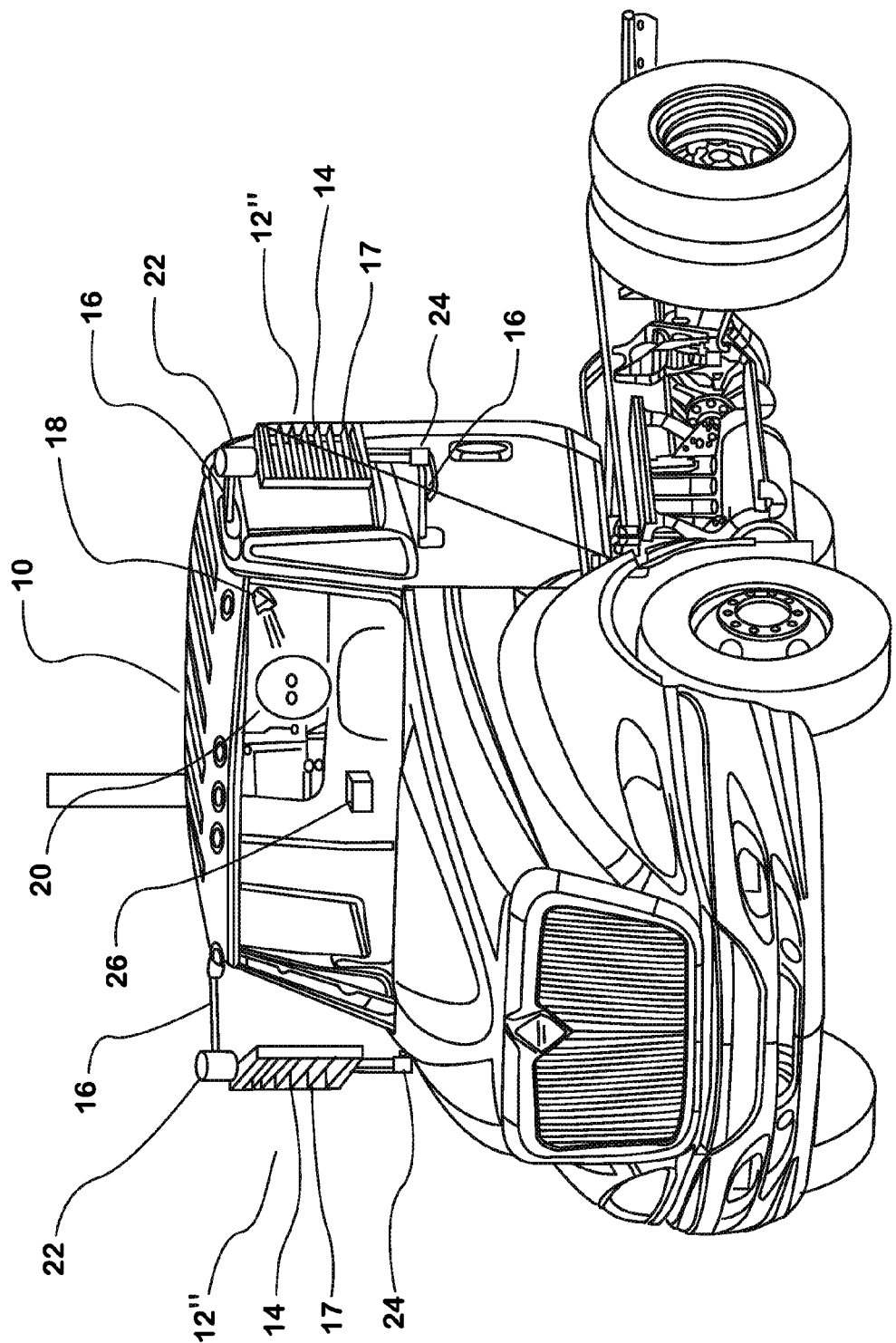
FIG. 6 is a schematic view of a vehicle having an automatically adjusting side mirror assembly with a mirror subassembly comprised of multiple horizontal slats in a second position.

FIG. 5 and FIG. 6 each show a schematic view of a vehicle 10 having a second alternative embodiment of automatically adjusting side mirror assemblies 12". The automatically adjusting side mirror assemblies 12" in FIG. 5 and FIG. 6 have mirror subassemblies 14 comprised of horizontal mirror slats 17, as well as support brackets 16. The support brackets 16 are attached to the vehicle 10 and dispose the mirror subassemblies 14 away from the vehicle 10, such that the mirror subassemblies 14 provide a view of the areas behind and to the sides of the vehicle 10. The vehicle 10 has an eye gaze detection system 18 to monitor the direction an operator 20 of the vehicle 10 is looking The eye gaze detection system 18 again uses traditional eye gaze detection technology, such as that described in U.S. Pat. No. 7,043,056 to determine whether the operator 20 is looking to one of the automatically adjusting side mirror assemblies 12".

The automatically adjusting side mirror assemblies 12" have actuator mechanisms 22 that connect the horizontal mirror slats 17 of the mirror subassemblies 14 to the support brackets 16. The actuator mechanisms 22 move the horizontal mirror slats 17 of the mirror subassemblies 14 from a first position for using the mirror subassemblies 14 when the operator 20 is looking to one of the automatically adjusting side mirror assemblies 12" (FIG. 5) and a second position when the operator 20 is not looking to one of the automatically adjusting side mirror assemblies 12" (FIG. 6). When the mirror subassemblies 14 are in the second position, the mirror subassemblies 14 provide a smaller aerodynamic profile due to the alignment of the horizontal mirror slats 17, thereby reducing aerodynamic drag on the vehicle 10. It is contemplated that the actuator mechanisms 22 may be electric motors, stepper motors, electromagnetic actuators, solenoids, pneumatic actuators, or other suitable actuating devices adapted to rapidly move the horizontal mirror slats 17 of the mirror subassemblies 14.

Biasing mechanisms 24 are again provided that connect the mirror subassemblies 14 to the lower part of the support brackets 16. The biasing mechanisms 24 bias the horizontal mirror slats 17 of the mirror subassemblies 14 to the first position, such that a failure of one or both of the actuator mechanisms 22 will allow the operator 20 of the vehicle 10 to use the mirror subassemblies 14 of the automatically adjusting side mirror assemblies 12". Therefore, the actuator mechanisms 22 must supply a force to the horizontal mirror slats 17 of the mirror subassemblies 14 to overcome the force provided by the biasing mechanisms 24. It is contemplated that the biasing mechanisms 24 may be permanent magnets, springs, gas struts, or other suitable passive biasing device, to provide the biasing force.

In operation, the operator 20 looks towards one of the automatically adjusting side mirror assemblies 12", and the eye gaze detection system 18 detects that the operator 20 is looking at one of the automatically adjusting side mirror assemblies 12". The actuator mechanism 22 quickly moves the horizontal mirror slats 17 of the mirror subassembly 14 of the automatically adjusting side mirror assembly 12" from the first position to the second position. Once the eye gaze detection system 18 detects the operator 20 is no longer looking towards one of the automatically adjusting side mirror assemblies 12", the actuator mechanism 22 moves the horizontal mirror slats 17 of the mirror subassembly 14 back to the second position. The biasing mechanism 24 supplies a force to the mirror subassembly 14 that the actuator mechanism 22 must overcome in order to position the mirror subassembly 14 to the second position as shown in FIG. 6.

In each of FIGS. 1 through 6, the actuator mechanisms 22 are shown near the top of the mirror subassemblies 14, and the biasing mechanisms 24 are shown near the bottom of the mirror subassemblies. It is contemplated that the actuator mechanisms 22 may be located near the bottom of the mirror subassemblies 14 or elsewhere on the support brackets 16, and that the biasing mechanisms 24 may be located near the top of the mirror subassemblies 14 or elsewhere on the support brackets 16.

While specific embodiments have been described in detail in the foregoing detailed description and illustrated in the accompanying drawings, those with ordinary skill in the art will appreciate that various permutations of the invention are possible without departing from the teachings disclosed herein. Accordingly, the particular arrangements disclosed are meant to be illustrative only and not limiting as to the scope of the invention, which is to be given the full breadth of the appended claims and any and all equivalents thereof. Other advantages to an Automatically Adjusting Side Mirror Assembly for a Vehicle and a vehicle made with this system may also be inherent in the invention, without having been described above.

What is claimed is:

1. An automatically adjusting side mirror assembly for a vehicle, the automatically adjusting side mirror assembly comprising:
    an eye gaze detection system;
    a mirror subassembly having a first position and a second position, the second position aligning the mirror subassembly generally parallel to the vehicle;
    a support bracket connected to the vehicle, the mirror subassembly being connected to the support bracket; and
    an actuator mechanism connected to the mirror subassembly, the actuator mechanism having a first position and a second position corresponding to the first position and the second position of the mirror subassembly, the actuator mechanism being disposed in electrical communication with the eye gaze detection system to position the mirror subassembly to the first position in response to an output of the eye gaze detection system indicating that an operator of the vehicle is looking toward the mirror subassembly and to position the mirror subassembly to the second position in response to an output of the eye gaze detection system indicating that an operator of the vehicle is not looking toward the mirror subassembly.

2. The automatically adjusting side mirror assembly of claim 1, further comprising:
    a biasing mechanism connected to the mirror subassembly, the biasing mechanism adapted to bias the mirror subassembly to the first position.

3. The automatically adjusting side mirror assembly of claim 2, wherein the actuator mechanism is coupled to the support bracket.

4. The automatically adjusting side mirror assembly of claim 2, wherein the actuator mechanism comprises an electric motor.

5. The automatically adjusting side mirror assembly of claim 2, wherein the actuator mechanism comprises a solenoid.

6. The automatically adjusting side mirror assembly of claim 2, wherein the biasing mechanism comprises a spring.

7. The automatically adjusting side mirror assembly of claim 2, further comprising a heating device attached to the actuator mechanism.

8. The automatically adjusting side mirror assembly of claim 2, wherein the first position aligns the mirror subassembly to generally provide a view towards a back end of the vehicle.

9. The automatically adjusting side mirror assembly of claim 2, wherein the mirror subassembly further comprises at least two vertical mirror slats.

10. The automatically adjusting side mirror assembly of claim 2, wherein the mirror subassembly further comprises at least two horizontal mirror slats.

11. A vehicle having an automatically adjusting side mirror assembly comprising:
    an eye gaze detection system;
    a controller disposed in electrical communication with the eye gaze detection system and configured to receive an output signal of the eye gaze detection system;
    an automatically adjusting side mirror assembly having a mirror subassembly and a support bracket, the mirror subassembly having a first position and a second position, the mirror subassembly being connected to the support bracket, the second position aligning the mirror portion generally parallel to the vehicle; and
    an actuator mechanism connected to the mirror subassembly, the actuator mechanism having a first position and a second position corresponding to the first position and the second position of the mirror subassembly, the actuator mechanism being disposed in electrical communication with the controller to position the mirror subassembly to the first position in response to an output of the controller indicating that an operator of the vehicle is looking toward the mirror subassembly and to position the mirror subassembly to the second position in response to an output of the controller indicating that an operator of the vehicle is not looking toward the mirror subassembly.

12. The vehicle having an automatically adjusting side mirror assembly of claim 11, further comprising:
    a biasing mechanism connected to the mirror subassembly, the biasing mechanism biasing the mirror subassembly to the first position.

13. The vehicle having an automatically adjusting side mirror assembly of claim 12, wherein the actuator mechanism is coupled to the support bracket.

14. The vehicle having an automatically adjusting side mirror assembly of claim 12, wherein the actuator mechanism comprises an electric motor.

15. The vehicle having an automatically adjusting side mirror assembly of claim 12, wherein the actuator mechanism comprises a solenoid.

16. The vehicle having an automatically adjusting side mirror assembly of claim 12, wherein the biasing mechanism comprises a spring.

17. The vehicle having an automatically adjusting side mirror assembly of claim 12, further comprising a heating device attached to the actuator mechanism.

18. The vehicle having an automatically adjusting side mirror assembly of claim 12, wherein the first position aligns the mirror subassembly to generally provide a view towards a back end of the vehicle.

19. The vehicle having an automatically adjusting side mirror assembly of claim 12, wherein the mirror subassembly further comprises at least two vertical mirror slats.

20. The vehicle having an automatically adjusting side mirror assembly of claim 12, wherein the mirror subassembly further comprises at least two horizontal mirror slats.

21. A method of operating an automatically adjusting side mirror assembly for a vehicle having an eye gaze detection system, the method comprising:
- determining whether a vehicle operator is attempting to use the automatically adjusting side mirror assembly by utilizing the eye gaze detection system;
- positioning a mirror subassembly of the automatically adjusting side mirror assembly to a first position from a second position when the eye gaze detection system determines the vehicle operator is attempting to use the automatically adjusting side mirror assembly, wherein the first mirror subassembly position generally provides a view toward a back end of the vehicle and the second mirror subassembly position is generally parallel to the vehicle.

\* \* \* \* \*